United States Statutory Invention Registration [19]

[11] Reg. Number: H199

Chenausky et al. [43] Published: Jan. 6, 1987

[54] GROUND SLOT WAVEGUIDE LASER

[75] Inventors: Peter P. Chenausky, Avon; Erroll H. Drinkwater, Portland; Lanny M. Laughman, Bolton, all of Conn.

[73] Assignee: The United States of America as represented by the Secretary of the Army, Washington, D.C.

[21] Appl. No.: 712,943

[22] Filed: Mar. 18, 1985

[51] Int. Cl.[4] ..... E04B 1/16
[52] U.S. Cl. ..... 51/326
[58] Field of Search ..... 51/326, 327, 283 R, 51/283 E, 284 R, 284 E, 281 R

[56] References Cited

U.S. PATENT DOCUMENTS

| | | | |
|---|---|---|---|
| 4,129,836 | 12/1978 | Papayoanou | 331/94.5 D |
| 4,150,479 | 4/1979 | Losee et al. | 51/327 |
| 4,241,319 | 12/1980 | Papayoanou | 331/94.5 G |
| 4,279,102 | 7/1981 | Hennenfent et al. | 51/281 R |
| 4,483,108 | 11/1984 | Howard | 51/327 |

FOREIGN PATENT DOCUMENTS

| | | | |
|---|---|---|---|
| 2329055 | 2/1975 | Fed. Rep. of Germany | 51/281 R |

OTHER PUBLICATIONS

IEEE Journal of Quantum Electronics: "An Improved $CO_2$ Channel Waveguide Laser"; Papayoanou; Jan. 1977.

*Primary Examiner*—Harold J. Tudor
*Attorney, Agent, or Firm*—Sheldon Kanars; Jeremiah G. Murray; Robert A. Maikis

[57] ABSTRACT

A method of fabricating $CO_2$ waveguide type lasers of the type comprising a slot formed in a broad surface of a hard ceramic material, comprising grinding the slot in a conventional surface grinding machine in two steps. The first step utilizes a coarse grinding wheel and the second a finer grinding wheel. The resultant laser cavity can produce high optical power output when provided with RF excitation.

3 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

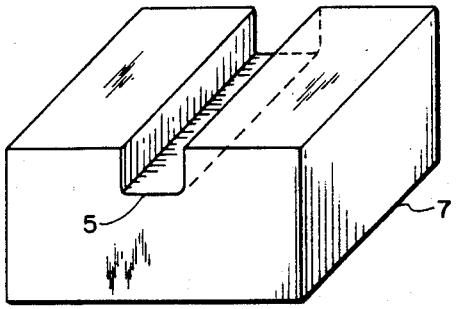
FIG. 1
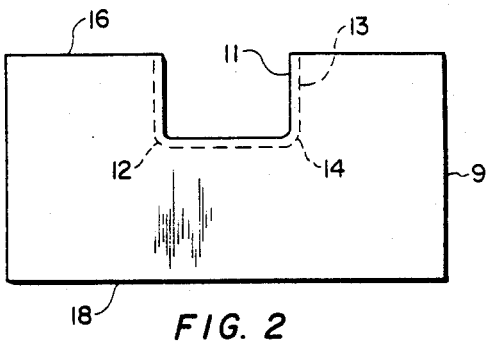
FIG. 2
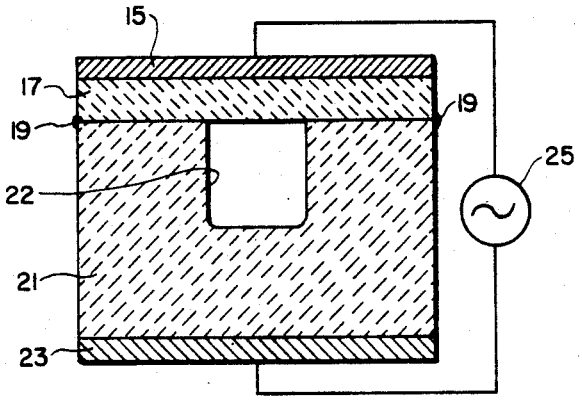
FIG. 3
FIG. 4
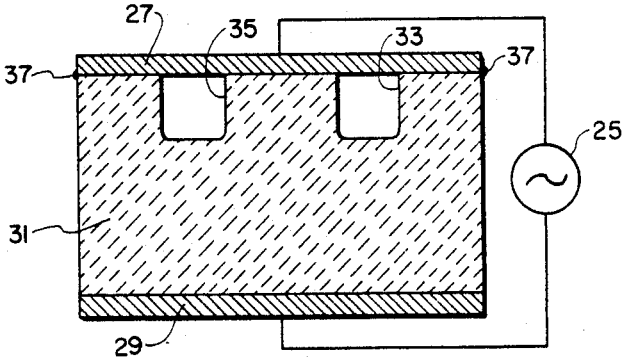

GROUND SLOT WAVEGUIDE LASER

The Government has rights in this invention pursuant to Contract DAAK80-79-C-0302, awarded by the Department of the Army.

BACKGROUND OF THE INVENTION

This invention relates to a technique or method of manufacturing lasers of the waveguide type. Such a laser comprises a cavity formed in a block of insulating material such as ceramic. The cavity comprises an elongated slot or channel usually formed along the center line on one of the broad faces of a rectangular block of the insulating material. A flat cover may be bonded to the slotted surface to form the fourth wall of the laser cavity. The flat cover may be of the same insulating material in which the slot is machined, or it may be a metal plate to which one terminal of an RF excitation generator is connected.

One advantage of an RF-excited waveguide gas laser is that the optical gain medium, usually $CO_2$, is completely isomorphic to the optical mode volume and as a result, all of the optical gain medium fully contributes to the single mode output of the laser. In order to promote the lowest loss waveguide mode, $EH_{11}$, of a laser with a cavity of square or rectangular cross section, care must be taken in the fabrication process to ensure that the waveguide has smooth and parallel walls. In the prior art, waveguide laser cavities have been formed by inserting a pair of parallel, spaced shims or spacers between a pair of large ground blocks so that the spacers form the cavity side walls. Any compromise to the parallelism of the waveguide walls will reduce discrimination between the desired lowest order laser oscillatory mode and higher order models, such that unstable oscillation due to transverse mode hopping will result. A slot or channel type waveguide laser, especially one fabricated of hard ceramic material according to the method of the present invention, has important advantages with respect to rigidity, smoothness of waveguide walls, has low susceptibility to misalignment caused by thermal expansion, and can be economically adapted to mass production in either single or multiple slot configurations.

SUMMARY OF THE INVENTION

The method of the present invention comprises machining the waveguide slots or channels in a block of hard ceramic material such as alumina ($Al_2O_3$) beryllium oxide (BeO) by means of a grinding operation. The preferred embodiment of the method comprises grinding the slot in a two stage or step operation, whereby most of the material of the slot is removed in the first stage with the use of a coarse grinding wheel which is slightly narrower than the width of the desired slot. The second or final grinding stage utilizes a wider grinding wheel with a finer abrasive material therein and the final grinding stage yields a slot of the desired dimensions with extremely smooth bottom and side walls and with good parallelism.

It is thus an object of the invention to provide an efficient manufacturing process or method for channel or slot type waveguide lasers.

Another object of the invewntion is to provide an efficient and economical method of producing waveguide lasers fabricated of hard ceramic material by grinding laser cavities in said ceramic material.

Another object of the invention is to provide a novel method of making slots or channels in hard ceramic material, which slots will have smooth and parallel walls which can function as a low loss cavity of a $CO_2$ waveguide laser, of the RF excited type.

These and other objects and advantages of the invention will become apparent from the following detailed description and the drawings.

BRIEF DESCRIPTION OF THE DRAWINGS

FIG. 1 shows a laser waveguide slot or channel which has been formed according to the present invention.

FIG. 2 illustrates the two steps or stages in the grinding operation required to form a slot in a block of ceramic material.

FIGS. 3 and 4 show cross sections of waveguide lasers fabricated according to the present invention.

DETAILED DESCRIPTION OF PREFERRED EMBODIMENTS

Waveguide lasers comprising slots machined in ceramic material are known in the prior art. For example, U.S. Pat. No. 4,129,836, issued on Dec. 12, 1978, describes such a laser in which the laser cavity is formed in boron nitride (BN) which is a soft ceramic material. Such soft ceramic compounds do not lend themselves to grinding operations and hence the slots therein are usually produced on milling machines. Milling operations in soft ceramics such as BN can result in tool marks in the cavity walls which can be deep enough to introduce scattering losses into the waveguides.

Waveguide lasers with slots formed by machining hard ceramic materials have also been suggested in the prior art, for example, see column 3, lines 26–44 of U.S. Pat. No. 4,241,319, issued on Dec. 23, 1980, however no details are given in the prior art as to how effective machining could be accomplished in hard ceramic materials such as alumina or beryllium oxide. It is quite likely that such prior art laser waveguide channels in these hard ceramics were formed on milling machines, with the aforementioned properties of this type of machining operation.

FIG. 1 shows a rectangular block 7 of hard ceramic material which may for example be alumina, beryllium oxide or some like material which has been molded into shape and fired to form an extremely hard refractory ceramic solid. The slot 5, shown centrally located on one of the broad faces of the block 7, has been ground in the block 7 after the firing thereof, using the technique of the present invention. FIG. 2 is an end view of a similar block which illustrates the two stage grinding process or method by which the slot is ground. In FIG. 2, the ceramic block 9 has upper and lower surfaces 16 and 18, respectively. Before the slot is ground, these upper and lower surfaces are rendered flat and parallel to within (+0.0005 to +0.001 in.) in accordance with conventional practice, for example by grinding in a surface grinding machine. Then, in the first step or stage of the slot grinding process, a commercially available copper grinding wheel with coarse diamond dust embedded therein is used to remove most of the ceramic material of the slot. This coarse diamond dust may for example be of 80 grit. In FIG. 2 the finished slot 13 is shown with a dashed line and the solid line 11 indicates the incomplete slot after the completion of the first or coarse grinding step. The slot is enlarged to its finished dimensions as shown by 13, with the use of a second grinding wheel which is as wide as the width of the desired slot and which can also be a copper wheel but has a finer diamond dust embedded therein, for example, 220 grit dust. Both of the wheels can be of the same diameter, for example, 10 inches, and a conventional surface grinding machine can be used to practice the invention. The use of the coarse grit wheel to remove most of the slot material saves grinding time and also results in less wear on the second or finishing wheel. Approximately 90% of the slot material should be removed in the coarse grinding operation or step. The finished slot will have smooth and parallel surfaces as a result of the second grinding step with the fine grit wheel. In order to prolong the grinding wheel lives, the cutting surfaces therof are sprayed with a water based lubricating solution. Each pass of the grinding wheel over the ceramic block removes only a few thousands of an inch of ceramic material. A grinding wheel speed of 3600 rpm has been found satisfactory for these grinding operations.

If for example the finished slot is to have a square cross section 2.28 mm on a side, the first grinding step might be accomplished with a 2.16 nm wide wheel loaded with 80 grit dust and rotated at 3600 rpm. The slot would be ground in the first step to a depth of approximately 2.16 mm to form a square slot. The final step is performed with a 2.28 mm wide wheel with the 220 grit therein to form the finished slot. A waveguide laser cavity of this cross section may be up to 34 cm in length.

As shown in FIG. 2, each of the corners of the slot, 12 and 14, have small radii thereon due to the rounded edges of the grinding wheels. This rounding is unavoidable with this type of machining but if the corners have radii of less than 0.003 inches, no measurable adverse effect on power output have been found as a result thereof. For example, $CO_2$ lasers of the RF-excited waveguide type having a CW output of up to 31 watts from a 37 cm long active medium have been built using this technique. This output power level is approximately twice that of a DC-excited waveguide laser of similar length.

FIG. 3 shows a cross section of a waveguide slot type laser which has been fabricated according to the present invention. The ceramic block 21 has the slot 22 ground along the center of the upper surface thereof. The flat cover or top 17 is of the same ceramic material as block 21 and is bonded thereto by means of a bead of bonding material 19 around the edges of the joint between these two ceramic pieces. One of the advantages of hard ceramic materials like alumina and beryllium oxide is that they are much easier to bond to themselves and to metals than is boron nitride and other soft ceramics. The laser of FIG. 3 has applied thereto a pair of parallel metal plates or electrodes, one mounted above ceramic cover 17 and designated by reference numeral 15, and the second, 23, attached to the lower surface of ceramic block 21. These electrodes are connected to an RF (radio frequency) signal source 25, which provides RF excitation for the gaseous laser medium within the waveguide cavity 22.

FIG. 4 illustrates a waveguide type laser in which two parallel slots are ground into a common ceramic block 31 to form twin $CO_2$ lasers. Also, in this embodiment, the top ceramic cover is dispensed with and the metal electrode 27 is placed directly on top of the ceramic block to perform the dual functions of the upper waveguide wall and as one electrode for applying RF excitation to the electrically common laser cavities. The other excitation electrode is 29.

In addition to the advantages pointed out above, lasers formed from hard ceramics are superior to those made from soft ceramics in that the hard ceramic is more resistant to sputtering at high operating temperature. Also, BeO has an extremely high thermal conductivity and this rapidly removes heat from the gaseous gain medium with a minimal thermal gradient, thus reducing waveguide distortion due to bending.

While the invention has been described in connection with an illustrative embodiment, obvious variations therein will occur to those skilled in the art without the exercise of the invention, accordingly the invention should be limited only by the scope of the appended claims.

What is claimed is:

1. A method of fabrication of slot type RF excited waveguide lasers which are composed of hard ceramic material, comprising the steps of; placing a block of said hard ceramic material, which has flat and parallel upper and lower broad surfaces, in a surface grinding machine and grinding a slot in one of said broad surfaces using a two step grinding operation in which the first of said grinding steps comprises the use of a coarse grinding wheel which is used to remove approximately 90% of the material of said slot and the second step comprises the use of a finer grinding wheel to remove the remainder of the material of said slot.

2. The method of claim 1 wherein the said coarse grinding wheel comprises a copper wheel with 80 grit diamond dust embedded therein and the said finer grinding wheel comprises a copper grinding wheel with 220 grit diamond dust therein.

3. The method of claim 1 wherein the said finer grinding wheel produces a finished slot with radii at the corners thereof which are less than 0.003 inches.

* * * * *